Figure 1:
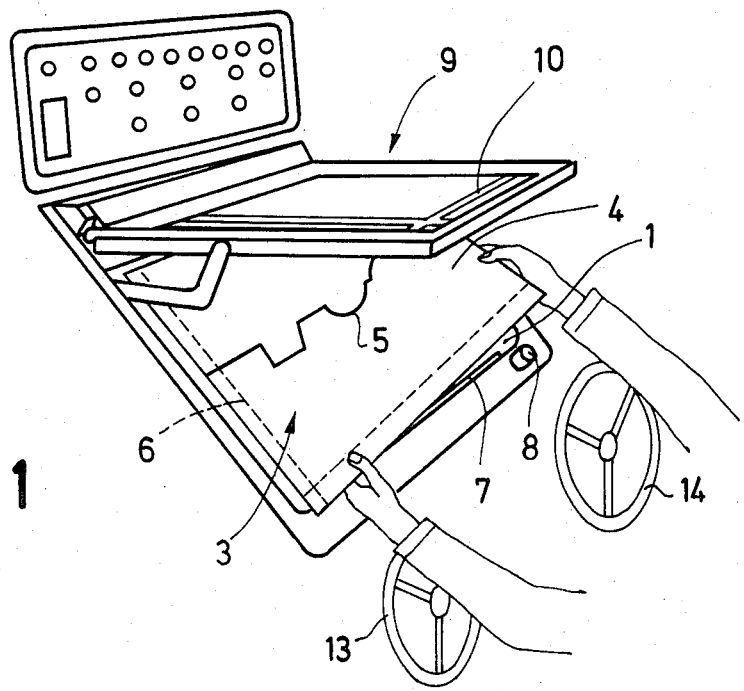

United States Patent [19]

Kolb

[11] Patent Number: 4,524,521
[45] Date of Patent: Jun. 25, 1985

[54] PROJECTION TABLE FOR AN OPTICAL PROJECTION PATTERN GRINDING MACHINE

[76] Inventor: Alfred Kolb, Haus am Tannenberg, D-6980 Wertheim, Fed. Rep. of Germany

[21] Appl. No.: 486,825

[22] Filed: Apr. 20, 1983

[51] Int. Cl.³ .............................................. G03B 23/00
[52] U.S. Cl. ................................ 33/1 AA; 33/185 R; 51/165.72; 353/28
[58] Field of Search ........................ 51/100 R, 165.72; 356/391, 392, 393; 33/1 AA, 1 R, 184.5, 180 R, 185 R; 353/27 R, 28, DIG. 1, DIG. 5

[56] References Cited

U.S. PATENT DOCUMENTS

| | | | |
|---|---|---|---|
| 2,460,491 | 2/1949 | Cooke | 51/100 R |
| 2,510,998 | 6/1950 | O'Brien | 356/391 |
| 2,652,664 | 9/1953 | Allan et al. | 51/100 R X |
| 4,105,312 | 8/1978 | Wells et al. | 353/27 R |
| 4,167,082 | 9/1979 | Kolb | 51/165.72 |

FOREIGN PATENT DOCUMENTS

| | | | |
|---|---|---|---|
| 923774 | 2/1955 | Fed. Rep. of Germany | 51/100 R |
| 2648013 | 4/1978 | Fed. Rep. of Germany | 51/165.72 |

*Primary Examiner*—William D. Martin, Jr.
*Attorney, Agent, or Firm*—Kenway & Jenney

[57] ABSTRACT

In a projection table of an optical projection form grinding machine, with a transparent carrier for a form pattern drawing, which bears insertion marks, and with a transparent cover, which can be moved between an open position, in which the carrier is accessible for insertion of the form pattern drawing, and a closed position, in which the cover lies flush on the form pattern drawing and fixes it in position on the carrier, in order on the one hand to eliminate disturbing reflections, and on the other hand to obtain good visibility of the insertion marks during insertion, it is proposed that the cover be made nonreflecting or reflection-reducing, but displaying transparent regions, not made nonreflecting or reflection-reducing, above the insertion marks of the form pattern drawing.

8 Claims, 6 Drawing Figures

PROJECTION TABLE FOR AN OPTICAL PROJECTION PATTERN GRINDING MACHINE

The invention relates to a projection table of an optical projection pattern grinding machine, with a transparent holder for a form pattern drawing, which bears insertion marks, and which can be moved between an open position, in which the holder is accessible for insertion of the form pattern drawing, and a closed position, in which the cover lies flat on the form pattern drawing, and holds the drawing in fixed position on the holder.

Projection tables of such type are conventionally used in optical projection pattern grinding machines, in order to hold the transparent form pattern drawings in a defined position on the projection screen. In order to position the form pattern drawings precisely upon insertion, such projection tables have alignment rails, against which the form pattern drawings are placed. These alignment rails can be moved by mechanical means, so that at the same time, the form pattern drawing is also moved to the desired position. To control this, the form pattern drawings conventionally bear coordinates which are brough to coincide with corresponding marks on the projection table.

With familiar projection tables, the difficulty arises that the transparent cover which presses the form pattern drawing against the projection screen and holds it in position is usually highly reflective. Because of this, recognition of the intended form line and of the projected shadow image is made more difficult.

The invention is based on the task of improving a projection table of such kind, in such a way that disturbing reflections are avoided during operation, and nevertheless, no difficulties arise in insertion and alignment of the form pattern drawing.

This task is accomplished, according to the invention, in that the cover is made to be nonreflecting, or reflection-reducing, but it has transparent regions which are not made nonreflecting or reflection-reducing above the insertion markings for the form pattern drawing.

Thus, according to the invention, the cover is made nonreflecting, in a manner in itself familiar, for example by vapor deposition of a thin layer, or by roughening of the surface by mechanical or chemical means, or by other processes in themselves familiar. In this way, disturbing reflections are avoided.

If covers made reflection-reducing or nonreflecting in this way are placed at a certain distance above the form pattern drawing, however, the intended form line can no longer be seen distinctly, due to the nonreflecting or reflection-reducing condition, so that an alignment of the form pattern drawing with the requisite precision is not possible as long as the cover is separated from the form pattern drawing, for example in the raised position.

For this reason, according to the invention, it is further provided that certain regions of the cover are not made reflection-reducing or nonreflecting, those being the regions positioned above the insertion markings of the form pattern drawing, for example above the coordinate lines of the form pattern drawing. In this region, the cover is transparent in the conventional fashion, so that with the cover separated from the form pattern drawing, these insertion markings, e.g. coordinate lines, can still be seen distinctly. Through this configuration, it is possible to align the form pattern drawing precisely with the cover open. After alignment, the cover is closed, so that it lies flat on the form pattern drawing, and holds it firmly in position. In this position, the form pattern drawing, lying flat beneath the cover, can be seen clearly and distinctly, even through the nonreflecting or reflection-reducing regions of the cover, so that the reflection reduction or elimination causes no obstacle to the visibility of the form pattern drawing.

It is advantageous for the regions of the cover not made nonreflecting to be linear in form, in particular when these regions run parallel to the edges of the form pattern drawing. Two intersecting regions can be provided, which then correspond for example to the intersecting coordinate lines of the form pattern drawing.

In a preferred form of realization of the invention, it is provided for the cover to exhibit markings in the regions not made nonreflecting, for orientation of the insertion markings of the form pattern drawing. These markings are preferably etched into the cover.

Figure 2:
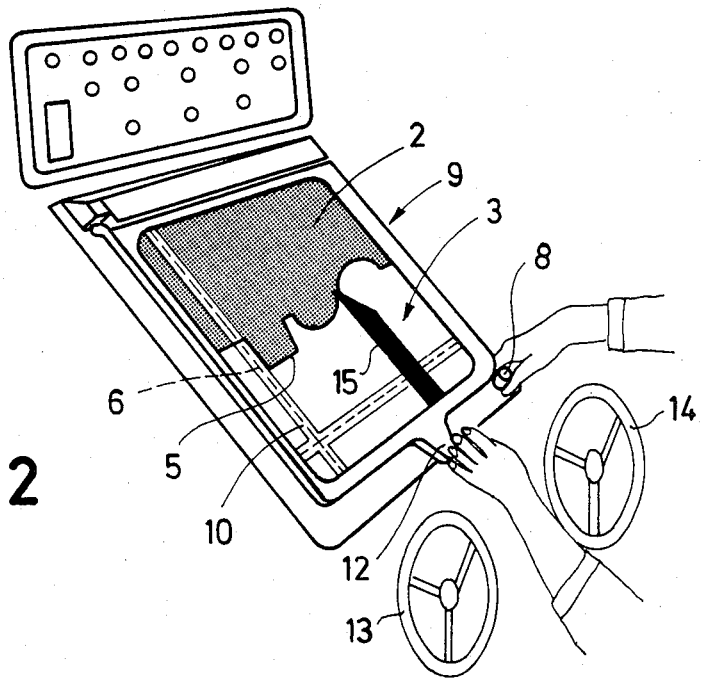
Figure 3:
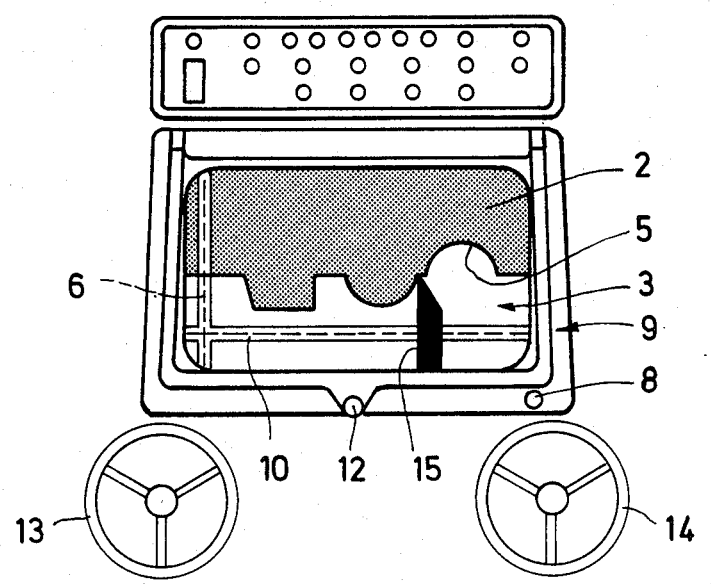
Figure 4:
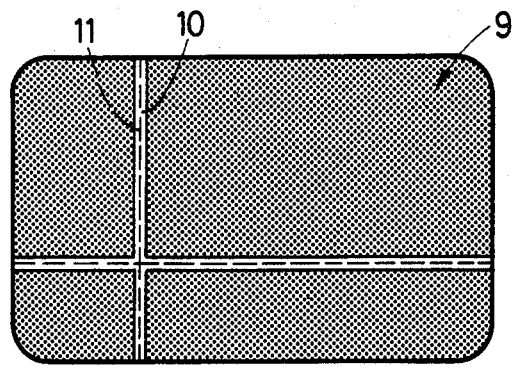
Figure 5:
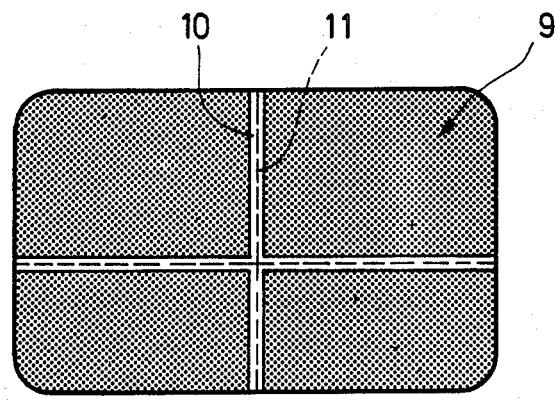
Figure 6:
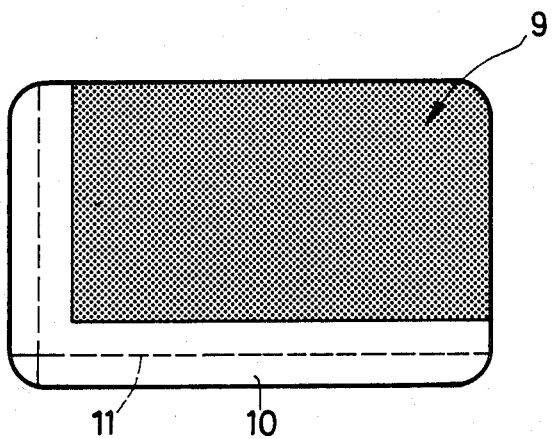

The following description of preferred forms of realization of the invention, in connection with the accompanying drawings, serves for more detailed explanation. The drawings show:

FIG. 1: an illustration of an opened projection table;

FIG. 2: a view similar to FIG. 1 of a not-yet completely closed projection table during alignment of a form pattern drawing;

FIG. 3: a top view of the fully closed projection table;

FIG. 4: a schematic representation of a first preferred form of realization of a cover according to the invention;

FIG. 5: a view similar to FIG. 4 of another preferred form of realization of a cover according to the invention; and FIG. 6: a view similar to FIG. 4 of another preferred form of realization of a cover according to the invention.

At the work station of the operator of a projection form grinding machine, not represented in the drawings, is located a projection screen 1, inclined to the horizontal, on which, in a manner in itself familiar, the shadow image 2 of the workpiece to be produced is made visible by the projection system.

On the projection screen 1 is placed a form pattern drawing 3, which consists essentially of a transparent medium 4, for example a plastic sheet, on which is drawn the desired pattern line 5. In addition, the medium 4 bears coordinate lines 6, for alignment of the form pattern drawing on the projection screen.

Associated with the projection screen 1 is an alignment rail 7, placed at the lower edge, which can be moved by means of an adjusting knob 8 and a mechanical linkage not represented in the drawing, in such a way that the form pattern drawing lying with its lower edge against the alignment rail 7 can be moved and aligned with respect to the projection screen.

At the upper edge of the projection screen 1 is hinged a cover 9, which can be pivoted between an open position (FIG. 1) and a closed position (FIG. 3). In the closed position, the cover lies flat on top of the form pattern drawing, and presses it against the projection screen.

According to the invention, the cover consists of a plate of transparent material, which is made either nonreflecting, or reflection-reducing. This can be done in a conventional manner, such as by vapor coating with a thin layer, by roughening the surface by chemical or mechanical means, or by providing a prescribed optical inhomogeneity of the material.

Of importance in this connection is that not all of the surface is made nonreflecting or reflection-reducing in this way, but rather the particular regions 10 are omitted, and are transparent in the usual fashion.

These regions 10 are preferably linear in form, and extend parallel to the edges of the form pattern drawing. It is advantageous for the cover to display two intersecting regions 10, as can be seen, for example, in the cover of FIG. 3.

In FIGS. 4 through 6 are represented additional possible configurations. The dotted regions here represent the nonreflecting or reflection-reducing regions, and the clear portions the untreated, not reflection-reducing regions 10. In the realization examples of FIGS. 4 and 5, the regions 10 form crosses with narrow arms, while in the realization example of FIG. 6, the regions 10 are broader, and extend directly along the lower and the left edges of the cover.

In all cases, the regions not treated to be nonreflecting or reflection-reducing are located above insertion marks of the form pattern drawing, for example above the coordinate lines 6 of the form pattern drawing.

It can be seen here, that the covers additionally bear markings 11 in the regions not made nonreflecting, which are, for example, etched into the cover. These markings 11 are configured in such a way that the insertion markings on the form pattern drawings, for example the coordinate lines 6, can be aligned on them, in order to place the form pattern drawing in the desired position.

For insertion and alignment of a form pattern drawing in the described projection table, first the cover is fixed in the open position represented in FIG. 1. In this position, the form pattern drawing 3 is inserted by hand, and placed with its lower edge on the adjustment rail 7.

In the next step, represented in FIG. 2, the cover is almost, but not completely, closed, so that the form pattern drawing can still be moved on the projection screen 1. In this slightly open position of the cover, the intended form line 5 on the form pattern drawing cannot be seen distinctly due to the nonreflecting or reflection-reducing condition of the cover, as these intended form lines, and all other information recorded on the form pattern drawing, are blurred.

This is not the case, however, in the regions 10 not made nonreflecting, through which the insertion marks of the form pattern drawing, for example the coordinate lines 6, can be discerned clearly and distinctly despite the slightly open cover. It is therefore easily possible for the person performing the insertion to align the form pattern drawing by aid of the adjusting knob 8, so that the insertion marks coincide either with markings on the projection screen, or with the markings 11, and thus the desired alignment of the form pattern drawing is achieved.

As soon as the form pattern drawing is oriented in this way, the cover is completely closed, and fastened by means of a latch 12, so that the form pattern drawing is clamped between the projection screen 1 and the cover 9, and fixed in its position.

In this position, the cover lies flush against the form pattern drawing, so that no significant visibility obstructions occur any longer due to the nonreflecting or reflection-reducing condition of the cover.

In this position, in conventional fashion the grinding wheel can be driven by means of the hand wheels 13 and 14, or by means of an automatic control, not represented, with the image 2 of the workpiece and the image 15 of the grinding disc being clearly visible through the cover, since the cover is completely or at least partially nonreflecting, and thus no longer produces disturbing reflections. Preferably, the intended form line 5 is within the nonreflecting region, so that the image of the point of contact of the grinding disc can be observed without reflections. The slight reflections which arise in the regions 10 are not disturbing.

I claim:

1. Projection table of an optical projection form grinding machine, comprising a transparent holder for a form pattern drawing, wherein said drawing bears insertion marks, and a transparent cover, wherein said cover can be moved between an open position in which the holder is accessible for insertion of the form pattern drawing, and a closed position, in which the cover lies flat on the form pattern drawing, and fixes it in position on the holder, and wherein said cover surface is made nonreflecting or reflection-reducing in the areas not above the insertion marks on the form pattern drawing.

2. Projection table according to claim 1 wherein the cover is vapor coated with a thin layer for nonreflectivity in the areas not above the insertion marks on the form pattern drawing.

3. Projection table according to claim 1 wherein the cover has a roughened surface for reflection-reduction in the areas not above the insertion marks on the form pattern drawing.

4. Projection table according to claims 1, 2 or 3, wherein the regions on said cover above the insertion marks are not made nonreflecting and are linear in form.

5. Projection table according to claim 4, wherein the regions not made nonreflecting on the cover above the insertion marks extend parallel to the edges of the form pattern drawing.

6. Projection table according to claim 5 wherein two intersecting regions on said cover above the insertion marks are provided.

7. Projection table according to claim 1 wherein the cover displays in the regions not made nonreflecting, for alignment of the insertion marks of the form pattern drawing.

8. Projection table according to claim 7 wherein the markings on said cover in the regions not made nonreflecting are etched into the cover.

* * * * *

UNITED STATES PATENT AND TRADEMARK OFFICE
CERTIFICATE OF CORRECTION

PATENT NO. : 4,524,521
DATED : Jun. 25, 1985
INVENTOR(S) : Alfred Kolb

It is certified that error appears in the above-identified patent and that said Letters Patent is hereby corrected as shown below:

The first column of the first page should include:

--Foreign Application Priority Data

Apr. 23, 1982 [DE] Fed. Rep. of Germany . . . P 32 15 188.8--

Signed and Sealed this

Twentieth Day of May 1986

[SEAL]

Attest:

DONALD J. QUIGG

Attesting Officer

Commissioner of Patents and Trademarks